(12) United States Patent
Knoell et al.

(10) Patent No.: US 12,644,506 B2
(45) Date of Patent: Jun. 2, 2026

(54) ELECTROMECHANICAL ACTUATOR HAVING DESIGN ELEMENTS FOR IMPROVED OIL GUIDANCE

(71) Applicant: Robert Bosch GmbH, Stuttgart (DE)

(72) Inventors: Reiner Knoell, Burgsinn (DE); Marco Knoell, Burgsinn (DE); Michael Goldbach, Lohr A. Main (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/954,942

(22) Filed: Nov. 21, 2024

(65) Prior Publication Data

US 2025/0172199 A1 May 29, 2025

(30) Foreign Application Priority Data

Nov. 27, 2023 (DE) ..................... 10 2023 211 785.1

(51) Int. Cl.
  *F16H 25/20* (2006.01)
  *F16H 57/04* (2010.01)
(52) U.S. Cl.
  CPC ......... *F16H 25/20* (2013.01); *F16H 57/0421* (2013.01); *F16H 57/0426* (2013.01); *F16H 57/0497* (2013.01); *F16H 2025/2031* (2013.01)
(58) Field of Classification Search
  CPC ............. F16H 25/20; F16H 2025/2075; F16H 57/0426; F16H 57/0497
  See application file for complete search history.

(56) References Cited

U.S. PATENT DOCUMENTS

| | | | | |
|---|---|---|---|---|
| 7,141,752 | B2 * | 11/2006 | Hochhalter | .......... H02K 11/215 |
| | | | | 219/86.25 |
| 9,856,957 | B2 * | 1/2018 | Van Mil | .................. F16H 25/24 |
| 10,626,980 | B2 * | 4/2020 | Rosengren | .............. F16H 25/20 |
| 11,073,202 | B2 * | 7/2021 | Houdard | ............. F16H 57/0436 |
| 11,560,939 | B2 * | 1/2023 | Keller | ................. F16H 57/0497 |
| 2024/0240429 | A1 * | 7/2024 | Iitani | ................... F16H 57/0497 |

FOREIGN PATENT DOCUMENTS

| | | | | | |
|---|---|---|---|---|---|
| DE | 102009007952 | B4 * | 4/2012 | ............... | H02K 7/08 |
| DE | 10 2015 221 712 | A1 | 5/2017 | | |
| DE | 10 2020 212 703 | A1 | 4/2022 | | |
| DE | 10 2020 212 704 | A1 | 4/2022 | | |
| DE | 102021133006 | A1 * | 6/2023 | ............ | E05F 15/622 |

* cited by examiner

*Primary Examiner* — Bobby Rushing, Jr.
(74) *Attorney, Agent, or Firm* — Maginot, Moore & Beck LLP

(57) ABSTRACT

A linear actuator includes a hermetically sealed housing, a cantilever that can be retracted into and extended out of the housing, and several components provided in the linear actuator. The components are configured so as to facilitate a flow of lubricating oil through the linear actuator, in particular when the cantilever is rapidly retracted and extended. This is achieved in that through-holes are provided in some components, through which lubricating oil and gas that has been filled into the housing can flow upon retraction and extension.

12 Claims, 4 Drawing Sheets

ELECTROMECHANICAL ACTUATOR HAVING DESIGN ELEMENTS FOR IMPROVED OIL GUIDANCE

This application claims priority under 35 U.S.C. § 119 to application no. DE 10 2023 211 785.1, filed on Nov. 27, 2023 in Germany, the disclosure of which is incorporated herein by reference in its entirety.

The present disclosure relates to an electromechanical actuator, for example, a lift cylinder referred to as an electric cylinder. In particular, the disclosure relates to an electro-mechanical actuator having a housing and a cantilever borne linearly on the housing, and specifically relates to oil guidance and lubrication in a such an actuator.

BACKGROUND

Such actuators are generally known in the prior art. For example, DE 10 2020 212 703 A1 and DE 10 2020 212 704 A1 discuss such an electric cylinder. DE 10 2020 212 703 A1 proposes that a threaded spindle driving a nut connected to a cantilever be borne such that a piston at the end of the threaded spindle delimit a first region from a second region in a fluid-tight manner. The second region is a cavity partially filled with lubricating oil, in which the threaded spindle is located. If the threaded spindle is extended, the pressure in this cavity is lowered, and if it retracts, the pressure is increased due to displacement by the spindle. DE 10 2020 212 704 A1 shows an actuator in which an end block of the housing is fastened not via a ring nut but rather via an intermediate plate and a fastening screw that pen-etrates the end block and the intermediate plate. The pivot bearing is thereby clamped by a clamping force of the fastening screw between the end block and the intermediate plate.

DE 10 2015 221 712 A1 discloses an actuator, wherein the cantilever projects out of the housing in the direction of the longitudinal axis, wherein a threaded spindle is borne on the housing rotatably in relation to the longitudinal axis by way of a pivot bearing, and the cantilever can be extended and retracted by way of a nut screwed on the threaded spindle. The threaded spindle is rotated via an electric motor. In particular, (friction) heat is produced at the screw engage-ment of the threaded spindle and the nut. Thus, the internal space is filled with a fluid or mixture of lubricating oil and gas, and cooling channels connect opposite ends of the internal space. When the nut moves, it displaces the fluid flowing through the cooling channels and past the threaded nut, for example, around rolling bodies that bear the threaded nut. The heat can thereby be efficiently transferred to the housing. The cooling channels are formed near the external surface of the housing, so that the heat transfer into the ambient air is also very efficient. The lubrication has a hermetic seal against the external atmosphere in order to eliminate leakage and contamination. Because the cantilever extends out of and retracts into the housing so that the internal volume changes, a complete filling with an incom-pressible fluid (or theoretically also with lubricating solids such as powder) is unfavorable, if not impossible. Con-versely, no satisfactory lubrication and cooling can be achieved with pure gas. Thus, the filling preferably consists of a portion of (incompressible) lubricating oil and a portion of (compressible) gas.

However, in particular when the cantilever is rapidly retracted and extended, the fluid cannot pass easily through the existing cooling channels and the threaded nut, so that a strong differential pressure is produced inside the linear actuator. This differential pressure results in a higher idle torque of the axle, which increases depending on the axle speed and thus the flow speed. This leads to a lower efficiency of the axle.

The liquid circulation in the housing as proposed in the aforementioned prior art does not solve the problem, because the liquid displaced from the interior of the canti-lever still needs to pass through the threaded nut.

SUMMARY

To solve this problem, the linear actuator according to the disclosure comprises several optimized design elements and/or components that further improve the fluid passage in the internal space of the linear actuator. In detail, the disclosure creates an electromechanical actuator having the features set forth below. Advantageous further developments are the subject-matter set forth below.

Because the components in the housing are arranged such that the lubricating oil can flow through through-holes upon a movement of the cantilever, lubrication is improved and the pressure differential is reduced.

The through-holes can run parallel to the longitudinal axis, at an angle, or skewed in relation to the longitudinal axis of the cantilever, or can also run radially.

Because substantial pieces rotate in the housing, upon each revolution, they dip into the oil in the oil-gas mixture. In the through-holes as well as on the external surfaces of the rotating parts, oil can adhere upon passage and can travel to areas that do not dip into the oil as well as to non-moving parts. This further improves the lubrication of parts that are "dry" (in gas content) and further minimizes friction between moving and non-moving parts.

In a preferred embodiment, a shaft sealing ring comprises through-holes in the predominantly radial direction that are permeable to oil. These holes can also have an axial com-ponent as well as a component in the circumferential direc-tion, i.e. they can run "obliquely" through the shaft sealing ring.

In a further preferred embodiment, corresponding through-holes are provided in at least one pivot bearing for supporting the cantilever. The cantilever is preferably borne in the housing via at least two pivot bearings, in particular rolling bearings. In these pivot bearings, openings in cages for the rolling bodies as well as through-holes in rolling bodies can be provided, for example hollow-bored rollers, and/or in bearing rings.

In yet another embodiment, at least one through-hole is provided in the threaded spindle. The threaded spindle is the component in the linear actuator which on the one hand rotates and on the other hand causes a linear movement of the cantilever. Therefore, the largest flow resistance on the threaded screw is expected upon rapid changes of state or movements of the linear actuator, and consequently, through-holes on and around the threaded spindle can mini-mize the problem of the pressure difference.

In addition, at least one through-hole can be provided in the sliding piston that bears the spindle on the side of the cantilever. Particularly preferably, this through-hole is com-bined with a through-hole in the threaded spindle.

In a further preferred embodiment, a through-hole is provided in the threaded nut in addition to or as an alterna-tive to the through-holes discussed thus far. Further prefer-ably, this through-hole runs parallel to the longitudinal axis of the actuator.

In a further preferred embodiment, at least one through-hole is provided in rolling bodies, in particular planets, that bear the threaded spindle in the threaded nut. Because planets and similar rolling bodies have relatively small diameters, it is advantageous in this embodiment to pierce a portion of the rolling bodies, or each rolling body, centrally.

Further preferably, the amount of oil and gas originally introduced into the actuator is selected such that, in the maximally retracted state of the actuator, an internal pressure in the actuator does not substantially exceed a value of 2 MPa, and in the maximally extended state does not substantially exceed a value of 0.8 MPa. With such a fill level in the retracted state, the pressure load is low, and even in the extended state, hardly any forces act on the seals, which could push contaminants into the linear actuator. In addition, even when proceeding rapidly, only small pressure differences can thus build up. Therefore, this pressure range is preferred.

While "through-holes" are referred to herein, it is obvious to those skilled in the art that the corresponding possibilities for passage of fluid can be brought about not only by drilling, but also by additive manufacturing, milling, etching, or otherwise, and it is only critical that fluid can pass through these "through-holes".

DETAILED DESCRIPTION

Two exemplary embodiments of the present disclosure will be described in the following on the basis of the accompanying figures.

First Exemplary Embodiment

Based on FIG. 1, the essential components of a linear actuator 10 are explained below, after which modifications of individual components are shown based on FIGS. 2 to 4.

Figure 1:
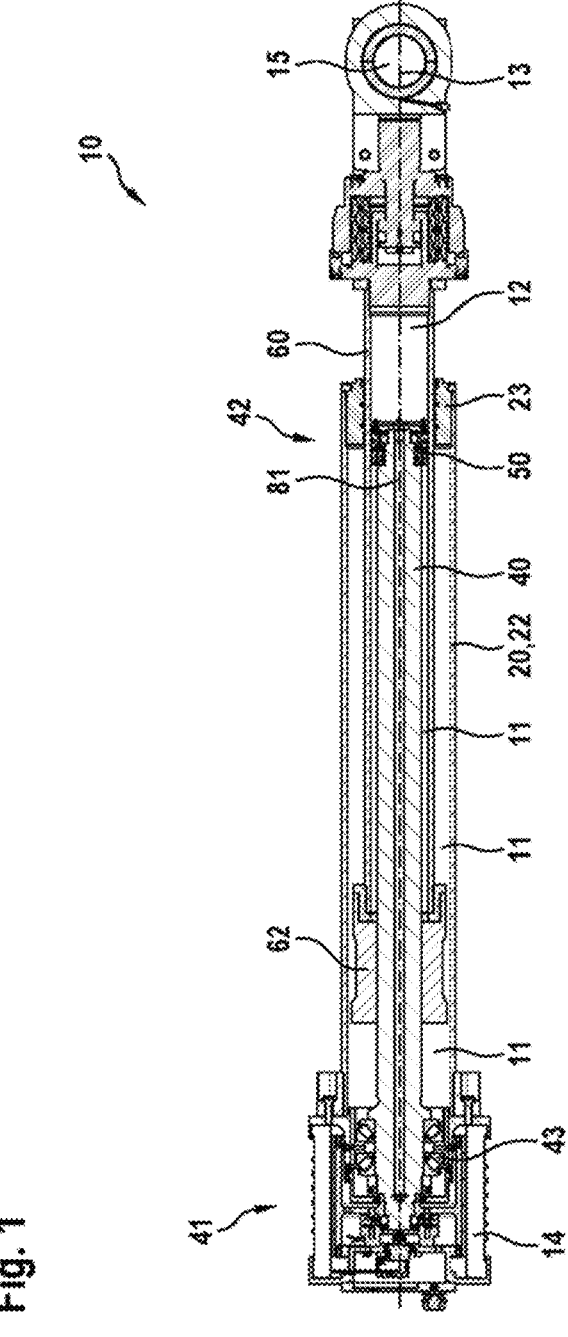
FIG. 1 is a diagram illustrating a system configuration according to a first exemplary embodiment of the present disclosure.

FIG. 1 shows a sectional view of a linear actuator 10. Along a longitudinal axis 13 in the figure from left to right (in the reading direction), the linear actuator 10 comprises as assemblies an electric motor 14, which is coupled at its first end 41 to a threaded spindle 40, which is borne in a spindle pivot bearing 43. In the present embodiment, the spindle pivot bearing 43 comprises two tapered roller bearings in an O-assembly and is accommodated in a bearing support 21 on the electric motor 14. The bearing support 21 together with a tube 22 and a guide 23 for a cantilever 60 (explained further below) forms a housing 20. A thread (not shown) is provided on the threaded spindle 40. A threaded nut 62 cooperating with the threaded spindle 40 is received in the tube 22 in a torque-proof and linearly movable manner. In the figures, the threaded nut 62 is shown as being screwed directly on the threaded spindle 40 for the sake of simplicity, but in reality, the threaded spindle 40 and threaded nut 62 are coupled to one another via rolling bodies not shown here, for example planetary gears, as is customary in the prior art.

If the electric motor 14 now rotates the threaded spindle 40, the threaded nut 62 in the tube 22 moves to the left and to the right. The threaded nut 62 is connected to the cantilever 60, which thus extends out of and retracts into the housing 20. The cantilever is guided in a third housing portion 23 of the housing 20. The third housing portion 23 also performs the sealing of the internal space against the external environment at the guide of the cantilever 60. Also provided are a piston 50, a piston pivot bearing 51, and a front plate 52. The piston 50 abuts in a substantially fluid-tight manner against an internal circumferential surface 61 of the cantilever 60 such that it seals a first cavity 11 in the tube 22 and a second cavity 12 in the cantilever 60 against one another, wherein the second cavity is arranged on the side of the piston 50 facing away from the spindle pivot bearing 43.

According to the disclosure, several of the aforementioned components comprise through-holes or longitudinal channels in order to improve a flushing or passage of lubricating oil and gas as a fluid, in particular upon rapid retraction and extension, and thereby reduce the pressure difference discussed above. For example, a first longitudinal channel 81 is provided as a through-hole in the threaded spindle 40. A second longitudinal channel 82 (or several channels) is provided in the bearing support 21. A third longitudinal channel 83 is located in the piston 50, and a fourth longitudinal channel 84 penetrates an adapter part 70 provided on the spindle nut 62. In addition to the longitudinal channels, skewed or radial through-holes such as a radial hole 24 in the bearing support 21 can also facilitate the passage of lubricating and cooling fluid.

With such through-holes in the components located in the hermetically enclosed space, the fluid can flow through the internal space of the linear actuator 10 with as little resistance as possible. This improves the efficiency, as discussed above.

A first cavity 11 in the bearing support 21 is at least partially filled with a liquid, as discussed. The threaded nut 62 is open at its two ends lying opposite one another in the direction of the longitudinal axis 13 such that the liquid can flow through the threaded nut 62 upon a movement of the cantilever 60.

Figure 2:
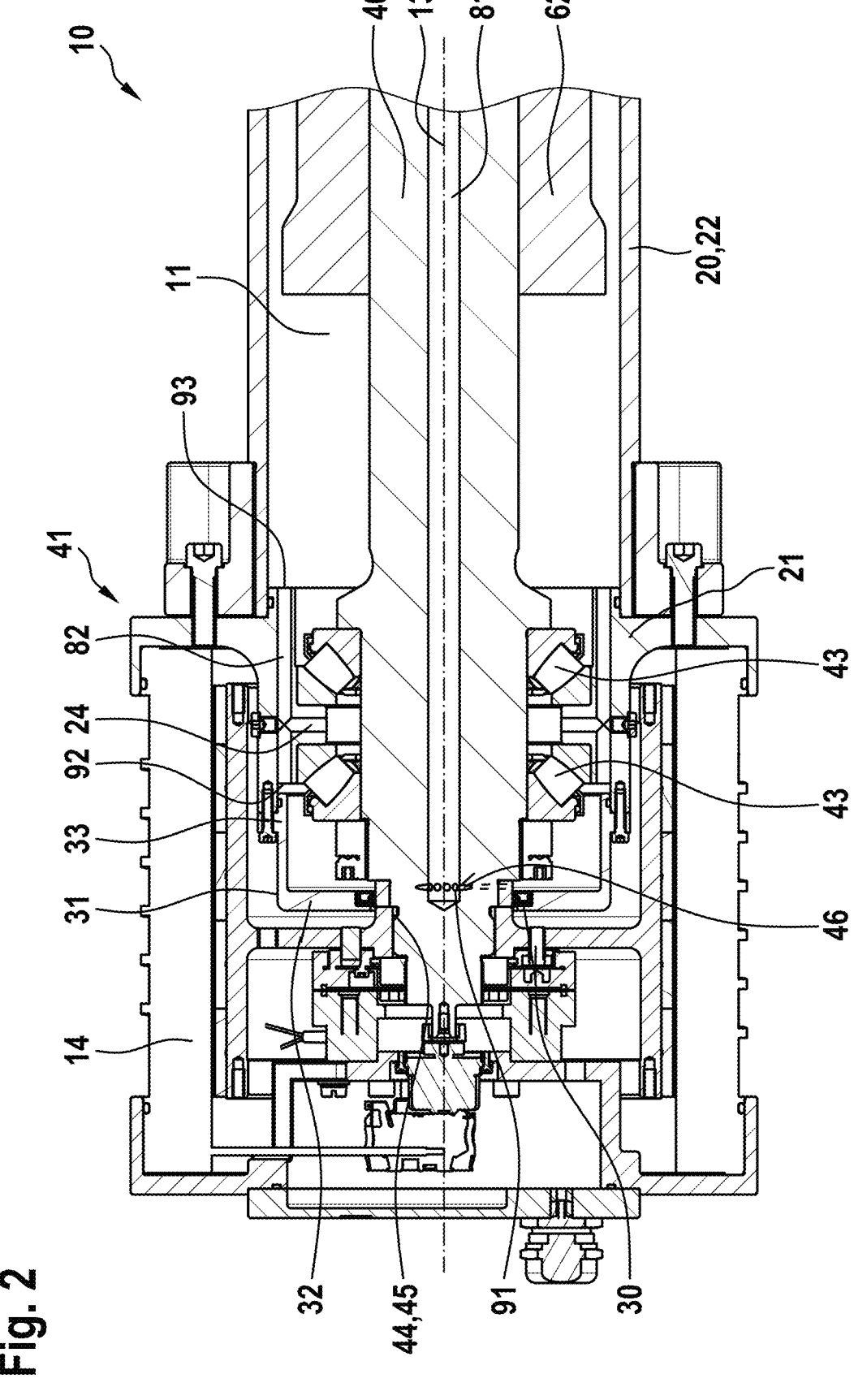
FIG. 2 is a diagram of a first pivot bearing as an enlarged section of FIG. 1.

As an example for the disclosure, a first longitudinal channel 81 is arranged inside the threaded spindle 40, as seen in FIG. 2, which channel extends along the longitudinal axis 13, wherein the first longitudinal channel 81 is fluidly connected to the first cavity 11 at its ends lying opposite one another along the longitudinal axis 13 such that, upon a movement of the cantilever 60, the liquid can flow through the first longitudinal channel 81 while bypassing the threaded nut 62 regardless of the position of the cantilever 60.

The spindle pivot bearing 43 is preferably configured as a rolling bearing, wherein it can comprise several tapered roller bearings or axial spherical roller bearings. For example, in FIG. 2, two tapered roller bearings in an O-assembly as the spindle pivot bearing 43 can be seen.

The threaded nut 62 and the threaded spindle 40 are preferably engaged with one another in a screw-like manner via rolling bodies, in particular in the manner of planetary threaded drive, wherein the rolling bodies are the corresponding planetary rollers. However, it is also contemplated that the threaded nut 62 and the threaded screw 50 are engaged in the manner of a ball screw drive, wherein the rolling bodies are balls that preferably circulate continuously. Adjacent to the rolling bodies, cavities are provided in the threaded nut 62, through which the fluid can flow. In the case of planets or rollers, holes can also be provided through the rollers or planets in the axial direction thereof in order to further reduce the resistance against the fluid flow.

The fluid comprises a proportion of gas and a proportion of liquid. The liquid is preferably oil, in particular lubricating oil. The portion of the first cavity 11 remaining after the liquid is preferably filled with a gas, in particular air or nitrogen. The gas volume is preferably chosen such that the volume change of the first cavity associated with the movement of the cantilever causes only a little over-pressure or under-pressure that stresses the sealing of the first cavity. For example, depending on the size and stroke of the actuator, a maximum over-pressure of 2 to 3 MPa with the actuator retracted and a maximum under-pressure of 0.2 to 0.5 MPa with the actuator fully extended is desired.

As can be seen from FIG. 2, the first longitudinal channel 81 penetrates the spindle pivot bearing 43. On the side of the spindle pivot bearing 43 facing away from the threaded nut 62, the threaded spindle 40 comprises on its external circumferential surface 45 at least one first opening 91, via which the first longitudinal channel 81 is fluidly connected to the first cavity 11 such that at least a portion of the liquid flows through the spindle pivot bearing 43 when the cantilever 60 is moved.

In addition, it can be seen from FIG. 2 that the threaded spindle 40 in this embodiment comprises on its external circumferential surface 45 a spindle sealing surface 44, which has a constant radius in relation to the longitudinal axis 13. The first opening 91 is arranged in the direction of the longitudinal axis 13 between a spindle sealing surface 44 and the spindle pivot bearing 43. The spindle sealing surface 44 is in sealing contact with a separate sealing ring 30. The sealing ring 30 is fastened on the housing 20 in such a way that it seals the first cavity 11.

As a further detail discernible in FIG. 2, in the embodiment shown, a separate, pot-like sealing support 31 is provided, having a bottom 32 and a toroidal edge 33 spaced apart from the bottom 32. The sealing ring 30 is fastened to the sealing support 31 in the region of the bottom 32, wherein the edge 33 of the sealing support 31 is fastened to the housing 20 radially outside and adjacent to the spindle pivot bearing 43. In addition, in the embodiment shown in FIG. 2, radially outside the spindle pivot bearing 43, the housing 20 comprises at least a second longitudinal channel 82, each of which comprises a second opening 92 and a third opening 93 lying opposite thereto in the direction of the longitudinal axis 13 of the second opening 92. The second opening 92 opens into the pot-like sealing support 31. On the side of the spindle pivot bearing 43 lying opposite the second opening 92, the third opening 93 opens into the first cavity 11 such that, upon a movement of the cantilever 60, the liquid can flow through the second longitudinal channel 82 while bypassing the spindle pivot bearing 43.

The second longitudinal channel 82 in the embodiment of FIG. 2 is arranged entirely on the bearing support 21, which receives the spindle pivot bearing 43. As illustrated in FIG. 2, at least one second longitudinal channel 82 can be associated with a radial hole 24 leading from the second longitudinal channel 82 into the interior of the bearing support 21.

As can be seen in FIG. 2, at least a first opening 91, preferably all of the first openings 91, is/are formed on the threaded spindle 40 from a single, straight hole 46, which opens into the first longitudinal channel 81. The straight hole 46 preferably opens into the latter at an internal circumferential surface of the longitudinal channel 81. As shown in FIG. 2, it is preferably formed with a constant cylindrical radius.

Figure 3:
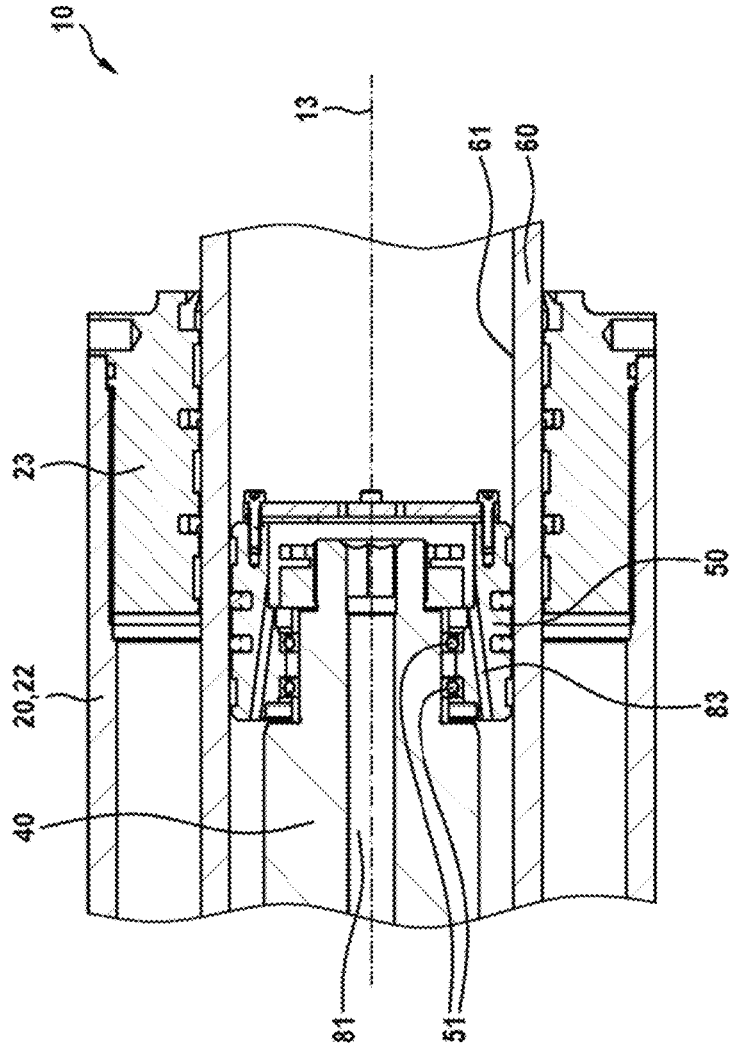
FIG. 3 is a diagram of an end of the housing of the linear actuator that is removed from the first pivot bearing, namely the end of a tube in which the cantilever is guided, as an enlarged section of FIG. 1.

FIG. 3 shows a further end of the housing 20, namely the end of the tube 22 in which the cantilever 60 is guided. As can be seen in FIG. 3, the first longitudinal channel 81 opens at its face into a second end 42 of the threaded spindle 40. A pot-like sliding piston, hereinafter briefly referred to as a piston 50, is rotatably received at the second end 42 of the threaded spindle 40 via a piston pivot bearing 51 about the longitudinal axis 13. The piston pivot bearing 51 is configured such that fluid can flow through the piston pivot bearing 51 upon a movement of cantilever 60. The piston pivot bearing can be configured as a rolling bearing or as a sliding bearing. In the case of a sliding bearing (not shown here), the bearing gap is preferably configured so as to be large enough to allow the liquid to pass through.

In this embodiment, the piston 50 also comprises the third longitudinal channel 83, which opens into the first cavity 11. The third longitudinal channel 83 passes by the piston pivot bearing 51 such that, upon a movement of the cantilever 60, the fluid can flow through the third longitudinal channel 83 while bypassing the piston pivot bearing 51.

Figure 4:
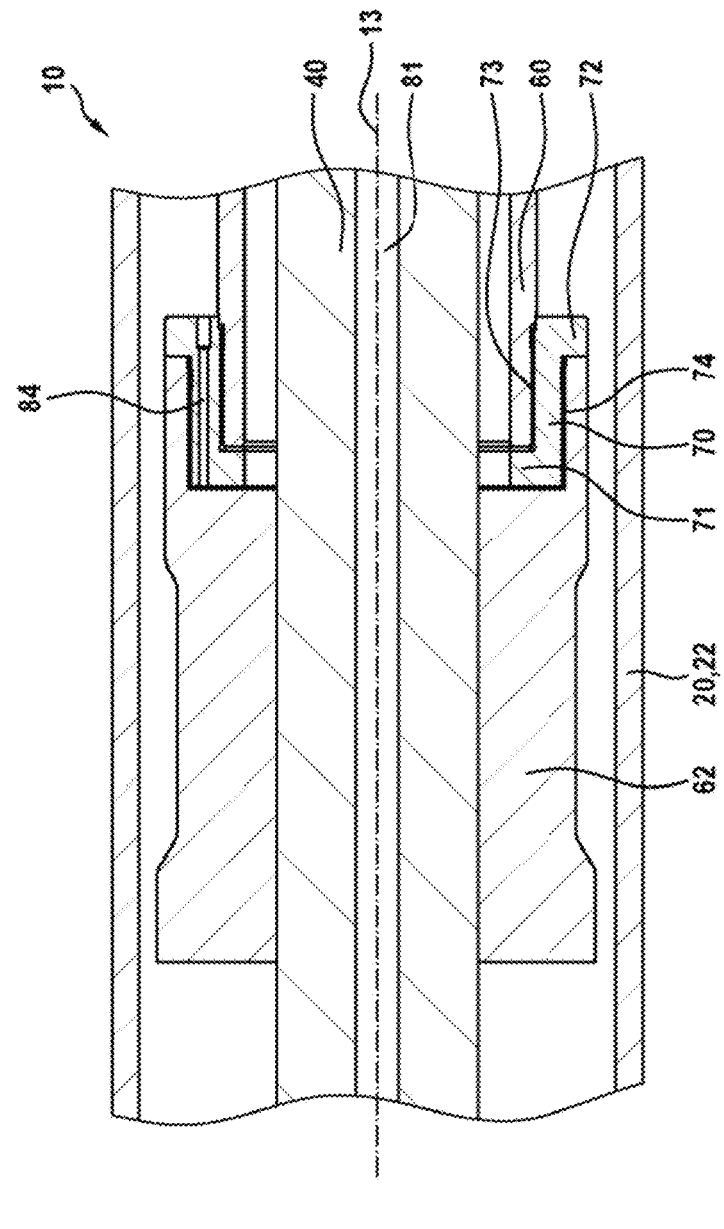
FIG. 4 is a diagram of portions of a threaded nut and its surrounding environment, likewise as an enlarged section of FIG. 1.

FIG. 4 shows a preferred embodiment in which an adapter part 70 is provided on the threaded nut 62, which has an internal thread 73, an external thread 74, a first collar 71 projecting radially inward, and a second collar 72 projecting radially outward. The cantilever 60 is screwed into the internal thread 73 and tensioned against the first collar 71. The threaded nut 62 is screwed onto the external thread 74 and tensioned against the second collar 72. As can be seen from FIG. 4, the adapter part 70 is also penetrated in the direction of the longitudinal axis 13 by at least a fourth longitudinal channel 84, such that all of the liquid that flows through the threaded nut 62 upon a movement of the cantilever 60 passes through the at least one fourth longitudinal channel 84.

In this embodiment, the total flow resistance of the at least one fourth longitudinal channel 84 is selected such that, upon a movement of the cantilever 60, between 10% and 40% of the liquid flows through the threaded nut 62, while the remainder passes through the first longitudinal channel 81. Such a division has proven to be advantageous in terms of flow, strength, and wear.

What is claimed is:

1. A linear actuator, comprising:
   a housing;
   a cantilever, wherein the cantilever is borne along a longitudinal axis in a linearly movable manner in a first cavity of the housing and projects out of the housing, and wherein the cantilever comprises a second cavity and a threaded nut that engages in a screw-like manner with a threaded spindle, and wherein the threaded nut is configured to be borne in a torque-proof manner in the housing;
   a spindle pivot bearing in which the threaded spindle is borne in the housing at an end facing away from the cantilever; and
   a motor configured to rotate the threaded spindle,
   wherein the housing and the cantilever are configured to define a space that is hermetically sealed against the external atmosphere by way of seals and is filled with a fluid,
   wherein the fluid comprises compressible and incompressible constituents, and
   wherein two components are disposed in the space sealed against the external atmosphere, each component including at least one through-hole, respectively, which is open to the interior of the space for circulation of fluid therethrough upon a change of state of the linear actuator, wherein one of said two components is positioned between said threaded nut and said second cavity, and the other of said two components is positioned between said threaded nut and said end facing away from the cantilever.

2. The linear actuator according to claim 1, wherein said other of said two components comprises a shaft sealing ring.

3. The linear actuator according to claim 1, wherein said one of said two components comprises an additional pivot bearing for supporting the cantilever.

4. The linear actuator according to claim 1, wherein a through-hole is provided in the threaded spindle.

5. The linear actuator according to claim 1, further comprising a piston which is received at one end of the threaded spindle in a rotatable manner about the longitudinal axis via a piston pivot bearing.

6. The linear actuator according to claim 5, wherein a through-hole is provided in the piston.

7. The linear actuator according to claim 5, wherein the piston is configured in the form of a pot.

8. The linear actuator according to claim 1, further comprising an adapter part provided on the threaded nut, the adapter part including an internal thread, an external thread, a first collar projecting radially inward, and a second collar projecting radially outward, wherein the cantilever is screwed into the internal thread and tensioned against the first collar, and the threaded nut is screwed onto the external thread and tensioned against the second collar.

9. The linear actuator according to claim 1, wherein the fluid in the hermetically sealed space of the linear actuator comprises a liquid portion and a gaseous portion, wherein the amounts of the liquid portion and the gaseous portion are determined such that, in a maximally retracted state of the linear actuator, an internal pressure in the linear actuator does not substantially exceed a value of 2 MPa and the internal pressure in a maximally extended state does not substantially fall below a value of 0.8 MPa.

10. The linear actuator according to claim 1, wherein the threaded spindle comprises a spindle sealing surface on its external circumferential surface that has a constant radius in relation to the longitudinal axis, wherein the spindle sealing surface defines at least one first opening that is arranged respectively in the direction of the longitudinal axis between the spindle sealing surface and the spindle pivot bearing, wherein the spindle sealing surface is in sealing contact with a separate sealing ring, and wherein the sealing ring is fastened onto the housing in such a way that it seals the first cavity.

11. The linear actuator according to claim 1, wherein the motor is an electric motor.

12. A linear actuator, comprising:

a housing;

a cantilever, wherein the cantilever is borne along a longitudinal axis in a linearly movable manner in a first cavity of the housing and projects out of the housing, and wherein the cantilever comprises a second cavity and a threaded nut that engages in a screw-like manner with a threaded spindle, and wherein the threaded nut is configured to be borne in a torque-proof manner in the housing;

a spindle pivot bearing in which the threaded spindle is borne in the housing at an end facing away from the cantilever; and a motor configured to rotate the threaded spindle, wherein the housing and the cantilever are configured to define a space that is hermetically sealed against the external atmosphere by way of seals and is filled with a fluid, wherein the fluid comprises compressible and incompressible constituents, and wherein one or more components are disposed in the space sealed against the external atmosphere, each including at least one through-hole, respectively, which is open to the interior of the space for circulation of fluid therethrough upon a change of state of the linear actuator, wherein said one or more components includes the threaded nut, in which the at least one through-hole includes at least one through-hole that extends parallel to the longitudinal axis of the linear actuator.

* * * * *